United States Patent [19]
Taylor et al.

[11] Patent Number: 6,012,475
[45] Date of Patent: Jan. 11, 2000

[54] SELF-PIERCING VALVE ASSEMBLY

[75] Inventors: Peter J. Taylor, Bishops Wood; Leonard W. Strong, Birmingham, both of United Kingdom

[73] Assignee: Delta Engineering Holdings Limited, London, United Kingdom

[21] Appl. No.: 09/089,740

[22] Filed: Jun. 3, 1998

[51] Int. Cl.[7] ............................ B23B 41/08; F16L 41/06; F16K 43/00

[52] U.S. Cl. ................................ 137/15; 30/93; 137/318; 222/91; 285/197; 408/102; 408/137

[58] Field of Search ..................... 137/318, 15; 285/197, 285/198, 199; 30/92, 93, 94; 222/5, 83, 91; 408/87, 102, 137, 138

[56] References Cited

U.S. PATENT DOCUMENTS

| | | | |
|---|---|---|---|
| 3,038,490 | 6/1962 | Yocum | 137/318 |
| 3,162,211 | 12/1964 | Barusch | 137/318 |
| 3,198,206 | 8/1965 | O'Brien | 137/318 |
| 3,336,937 | 8/1967 | Ehrens et al. | 137/318 |
| 3,480,036 | 11/1969 | Ehrens et al. | 137/318 |
| 3,788,345 | 1/1974 | Tura | 137/318 |
| 3,973,584 | 8/1976 | McKinnon | 137/318 |
| 4,611,624 | 9/1986 | Snyder | 137/318 |
| 4,955,406 | 9/1990 | Antoniello | 137/318 |
| 5,694,971 | 12/1997 | Wilcock | 137/318 |

OTHER PUBLICATIONS

Our Revolutionary Lead Free Saddle Valve is Easy to Install, Reliable & Affordable; Touch–Flo Manufacturing Co.

*Primary Examiner*—George L. Walton
*Attorney, Agent, or Firm*—Womble Carlyle Sandridge & Rice; Loius T. Isaf

[57] ABSTRACT

The present invention comprises an improved method and apparatus, associated with a self-piercing valve assembly for mounting the self-piercing valve on a pipe and for constraining movement of the valve on the pipe. In accordance with a preferred embodiment of the present invention, a self-piercing valve assembly comprises a clamping assembly and a crimping member associated with the clamping assembly, which crimping member "automatically" crimps a pipe and forms a recess therein when the self-piercing valve clamping assembly is tightened about the pipe, and simultaneously effects a crimping member/recess interface (much like a key-and-keyway interface) which inhibits relative angular rotation between the pipe and valve. The crimping member is, preferably, a rigid, projection or tab.

34 Claims, 3 Drawing Sheets

SELF-PIERCING VALVE ASSEMBLY

CROSS REFERENCE TO RELATED APPLICATION

This application claims the benefit of U.K. Provisional Application No. 9718622.5, filed Aug. 22, 1997.

BACKGROUND OF THE INVENTION

1. Field Of The Invention

The present invention relates to valves, and more particularly, to a valve assembly that selectively attaches to a fluid-filled pipe to provide access to the fluid contained within the pipe.

2. Description Of The Related Art

Self-piercing valves sometimes referred to as "saddle valves" or self-tapping valves, are used to supply a fluid from a fluid-filled pipe at a location where a standard valve or other access has not been installed on the pipe. A self-piercing valve normally has an upper and lower member which are fitted about the pipe, and then the upper and lower members are fastened together to frictionally hold the pipe. Once held within the valve, a needle extending means is normally actuated to selectively extend a needle to puncture the pipe, thus providing access to the fluid contained within the pipe.

One known type of self-piercing valve has a hollow needle with a large diameter such that when the needle pierces the fluid-filled pipe, fluid flows from the pipe through the hollow interior of the needle into a passage within the upper member and to an outlet on the upper member self-piercing valve. With that self-piercing valve, the needle remains protruding into the pipe throughout its use period and, among other functions, the protruding needle assists in preventing relative angular rotation between the pipe and the valve.

Another known type of self-piercing valve uses a solid needle to pierce the pipe, which needle is retracted after puncture so that fluid flows from the pipe through the body of the valve. Upon retraction of the needle, the valve can spin about the pipe thereby causing the puncture site to leak.

To assist in prevention of relative rotation between the valve and the pipe, prior art self-piercing valves are typically provided with a set screw which is threaded normally through one of the fastening members to engage the pipe. Among some of the problems experienced by use of the set screw are: over tightening (including puncturing); and minimal surface contact between the set screw tip and pipe surface (such that the grip can easily weaken and slip over time).

Thus, there exists a need for an improved self-piercing valve assembly and method for mounting the valve to its host pipe.

SUMMARY OF THE INVENTION

Briefly described, the present invention comprises an improved method and apparatus, associated with a self-piercing valve assembly for mounting the self-piercing valve on a pipe and for constraining movement of the valve on the pipe. In accordance with a preferred embodiment of the present invention, a self-piercing valve assembly comprises a clamping assembly and a crimping member associated with the clamping assembly, which crimping member "automatically" crimps a pipe and forms a recess therein when the self-piercing valve clamping assembly is tightened about the pipe, and simultaneously effects a crimping member/recess interface (much like a key-and-keyway interface) which inhibits relative angular rotation between the pipe and valve. The crimping member is, preferably, a rigid, projection or tab and is elongated so as to maximize the "gripping surface" by which the valve resists rotation about the pipe. Furthermore, in accordance with the present invention, an elongated crimping member lessens the depth of "crimping" required, to effectively retard rotation of the valve on a pipe, relative to prior art valves utilizing single point set screws. Crimping members of different sizes are preferred for use with pipes of different diameters (or wall thickness). In accordance with the preferred embodiment of the present invention, the self-piercing valve includes a removable insert on which is formed the crimping member, and interchangeable adapters are included having crimping members of different sizes and including pipe-cradling "boots" of different sizes to accommodate use of the self-piercing valve of the present invention on various different diameter pipes.

Thus, it is seen that an improved self-piercing valve assembly is now provided that addresses the problems and shortcomings of the prior art. The self-piercing valve assembly and method of this invention allow for selective attachment to a fluid-filled pipe, and automatic interfacing with the pipe to resist angular rotation between the pipe and valve. These and other objects, features and advantages of the present invention will become apparent after reviewing and understanding the following descriptions, taken in conjunction with the accompanying drawings and claims.

DETAILED DESCRIPTION OF THE PREFERRED EMBODIMENT

Figure 1:
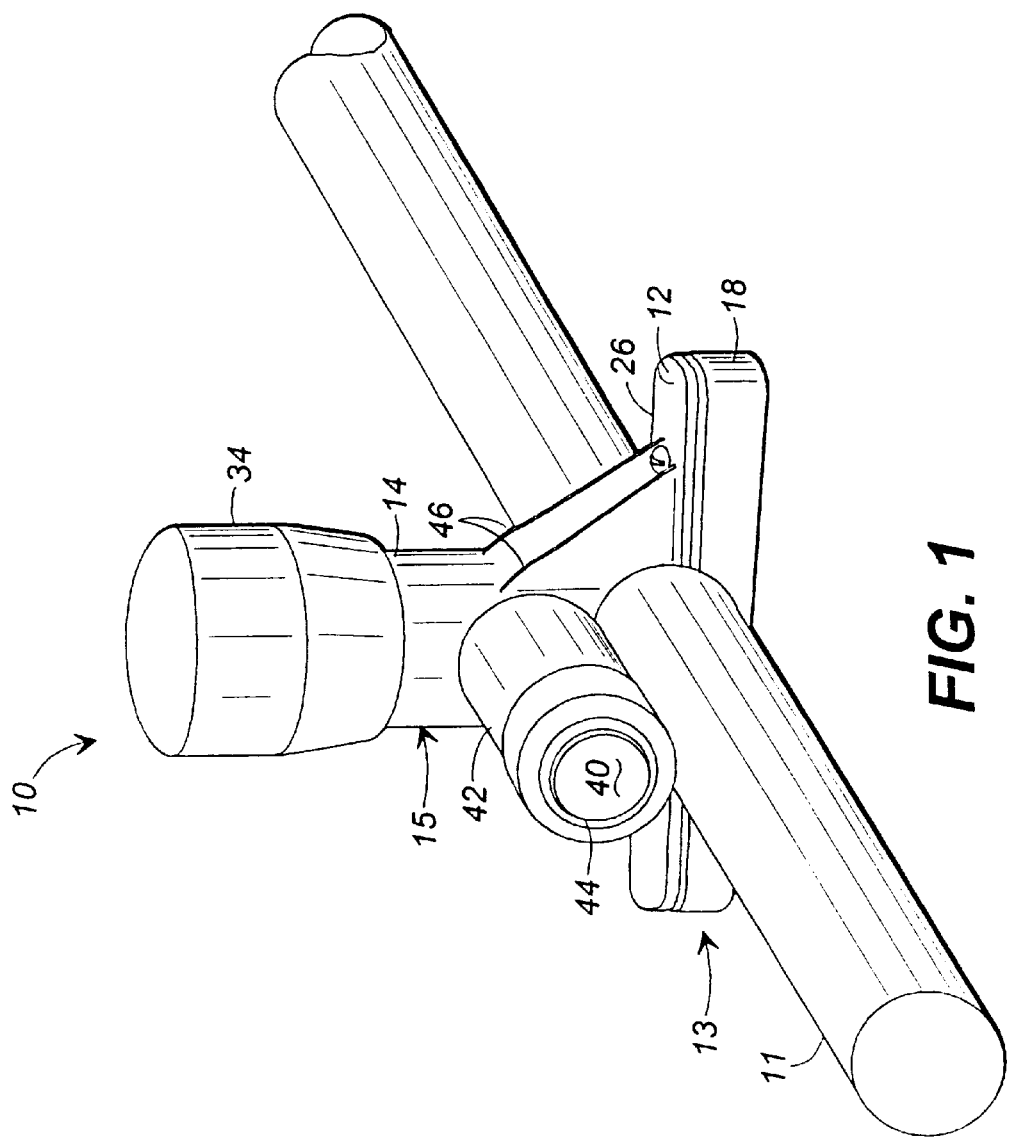
FIG. 1 is a perspective view of the preferred embodiment of the self-piercing valve assembly selectively attached to a fluid-filled pipe.
Figure 2:
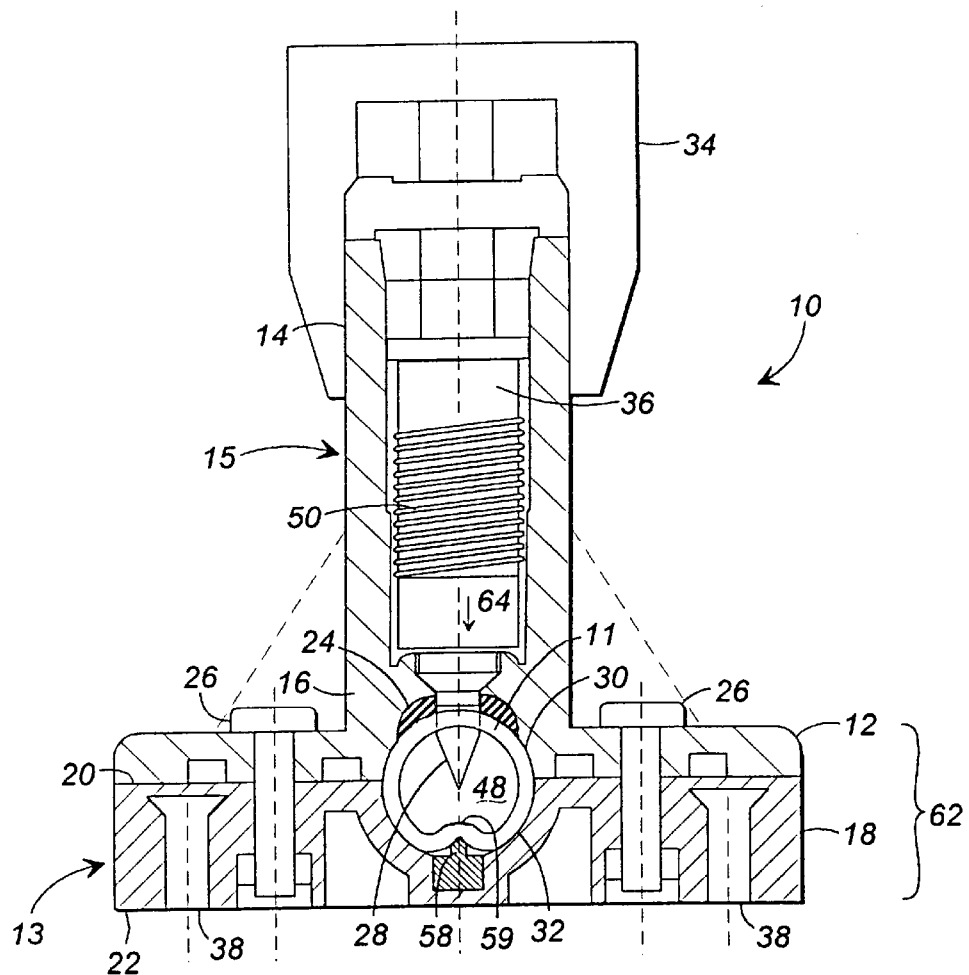
FIG. 2 is a front cross-sectional view of the self-piercing valve illustrating the present invention crimping member and indentation formed in the fluid-filled pipe.
Figure 3:
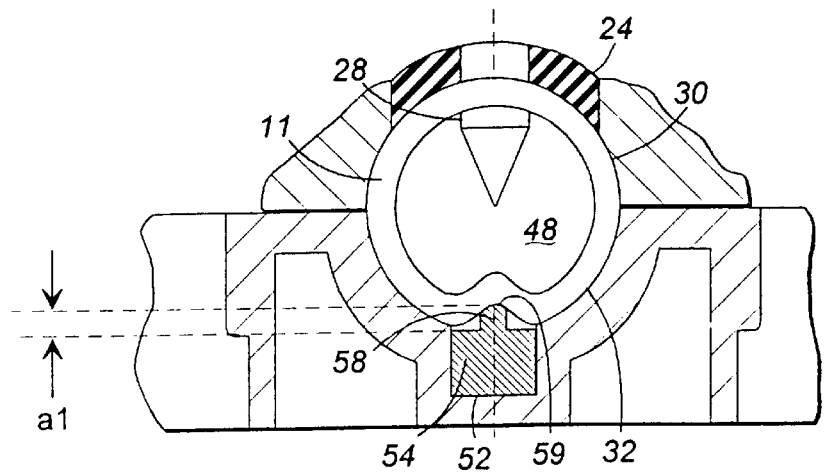
FIG. 3 is a front cross-sectional view of a fluid-filled pipe being held within the clamp by the crimping member on a removable insert of the present invention, and also shows the solid needle of the upper clamp member piercing the pipe.

Referring now in greater detail to the drawings, in which like numerals represent like components throughout the several views, FIG. 1 illustrates a perspective view of a self-piercing valve assembly functionally fitted about a fluid-filled pipe 11 which embodies principles of this invention in a preferred form. The self-piercing valve assembly 10 is comprised of a clamping assembly 13 which includes, at least, an upper clamp member 12 and a lower clamp member 18 (which are shown in FIGS. 1–3 fastened together around a fluid-filled pipe 11), and a pipe tapping assembly 15 integrally associated with the clamping assembly. The upper clamp member 12 has a top end 14 and a bottom end 16, and the bottom end 16 further has a recess 30 therein. The pipe-tapping assembly 15 is seen throughout the drawings as including devices known in the art, all of which function and interact in a manner understood by those skilled in the art. The preferred pipe-tapping assembly 15 is described in detail below.

Figure 4:
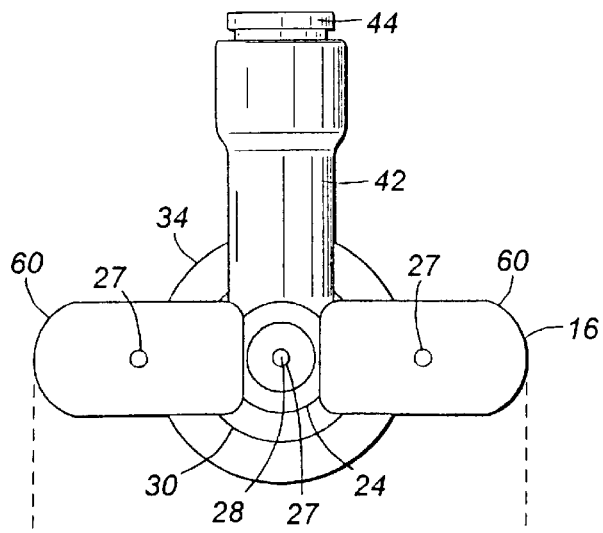
FIG. 4 is a perspective view of the bottom end of the upper clamp member, top side of the lower clamp member and the crimping member in operational relation to each other.

The lower clamp member 18, as particularly shown in FIGS. 2 and 4, has a top side 20 and a bottom side 22, and a recess 32 in the top side 20. The lower clamp member 18 also includes a pair of apertures 27 mirroring a pair of apertures 27 on the upper member 12 through which screws 26 may be fitted to affix the lower clamp member 18 to the upper clamp member 12, lower clamp member 18 is alternately embodied as including a pair of apertures 38 whereby the lower member 18 may be attached to a surface when screws (not shown) are placed through the apertures 38 into the surface to thereby hold the lower clamp member 18 to the surface as well as holding the upper clamp member 12 and a fluid-filled pipe 11 to the surface when the self-piercing valve 10 is fully assembled. The lower clamp member 18 further includes a crimping member 58 which, in the preferred embodiment, is in the form of an elongated tab or rigid projection projecting into the recess 32 of the lower clamp member 18. In operation, the crimping member 58 abuts and slightly deforms the fluid-filled pipe 11 to form an indentation 59 (as particularly shown in FIG. 3), simultaneously with and as part of the process of clamping the pipe in the clamp assembly 13. The crimping member 58 and indentation 59 cooperate in the manner of a key and keyway to retard relative rotation of the valve 10 and pipe 11 while the pipe is held in the clamp 62 (FIG. 2).

Figure 5:
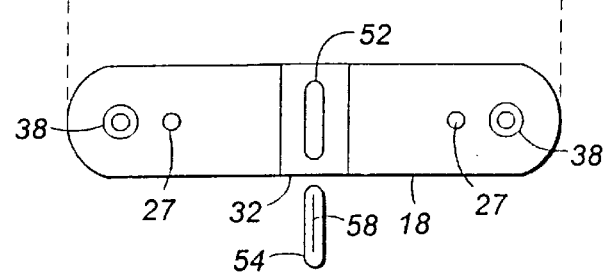
FIG. 5 is a side view of a pre-sized adapter (having a crimping member) in operational relation to a notch on the recess on the top side of the lower clamp member.
Figure 5:
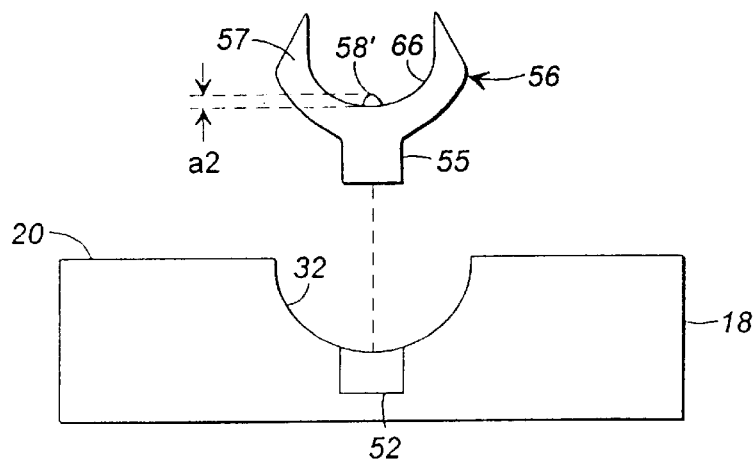
Figure 5A:
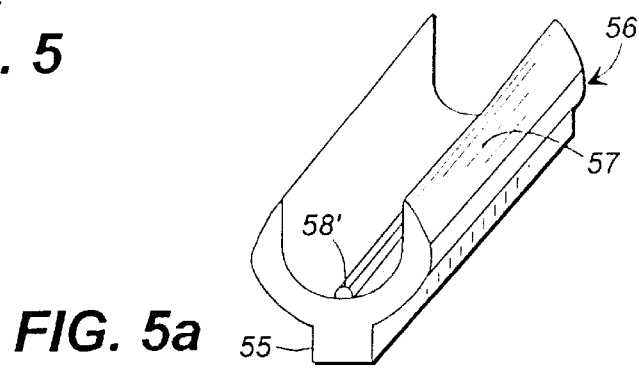
FIG. 5a is a perspective view of a pre-sized adapter illustrating the elongated crimping member.

In the preferred embodiment, the crimping member 58 is mounted or formed on a removable insert 54. The insert 54 is removably held in a notch 52 in the lower clamp member 18. In such preferred embodiments, the invention accommodates use of the device on piping of differing diameters through the use of adapters 56, an exemplary embodiment of which is shown in FIGS. 5 and 5a. Accordingly, the exemplary adapter 56 as shown in FIGS. 5 and 5a, includes a mounting tab 55 which fits within the notch 52 of the lower clamp member 18 and a pipe "boot" 57 to fit snugly about a pipe 11. The crimping member 58 of this adapter 56 is seen as an elongated rigid projection (58') projecting into the interior 66 of the boot.

When the fluid-filled pipe 11 is of a diameter to simply fit within the contours of recess 30 on the bottom end 16 of upper clamp member 12 and recess 32 on the top side 20 of lower member 18, a simple insert 54 with mounted crimping member 58 is used. When the adapter 56 is alternatively used, a pipe of different diameter than recesses 30 and 32 is held within the self-piercing valve 10, the pipe 11 having a diameter similar to the interior 66 diameter of the boot 57. Whereas, the crimping member 58 is shown mounted on (or formed) on a removable component. In alternate embodiments, the crimping member 58 is formed directly on the recess 32 of the clamp member 18. In either event, the crimping member 58, 58' functions to abut and slightly deform the fluid-filled pipe 11, forming the indentation 59.

The preferred embodiment of the pipe-tapping assembly 15 is a solid needle 28 extending through a gasket 24 into the recess 30 of the upper clamp member 12. The extension and retraction of the needle 28 is actuated by turning a rotating knob 34 rotatably attached to the top end 14 of upper clamp member 12, and the rotating knob 34 includes a threaded stem 36 which mates with an inwardly threaded portion 50 of the needle 28, as shown in FIG. 2, whereby rotation of the rotating knob 34 causes the inwardly threaded portion 50 of the solid needle 28 to move through interaction about the threaded stem 36 and actuate the needle 28, shown by arrow 64. Alternatively, the rotating knob 34, threaded stem 36, and needle 28 is in one piece, whereby rotation of the rotating knob 34 causes the entire assembly to extend and retract, although the needle 28 spins when such combination is used.

As embodied herein, the upper clamp member 12 and lower clamp member 18 are made from a thermally molded plastic, however any rigid material is alternatively used. The needle 28 and screws 27 are preferably metal, although any material having adequate strength and rigidity sufficient to perform the functions specifically recited herein are alternatively used. The gasket 24 is preferably a rubber gasket having an aperture therethrough, although other pliant materials are alternatively used so long as the fluid seal is maintained around the puncture site between the fluid-filled pipe 11 and the needle 28. While a rotating knob 34, threaded stem 36 and inwardly threaded portion 50 of the needle 28 have been disclosed as the structure for selectively extending and retracting the needle 28, other mechanical and electrical devices are alternatively used to perform the same function. Moreover, the preferred size of the self-piercing valve assembly 10 is about four inches in height, two and one-half inches across at the lateral extension 60, with a ⅗ of an inch in diameter passage 48 formed between recesses 30 and 32. The size of the self-piercing valve assembly 10 is alternatively adjusted depending upon the diameter of the pipes desired for the self-piercing valve 10 to selectively attach to.

It could be seen that, in accordance with the preferred embodiments of the present invention, the projection height (a1, a2) of the crimping member 58, 58' is pre-set and, as such, a preferred depth of indentation 59 is automatically pre-set by the manufacturer, for piping 11 of various diameters.

In accordance with acceptable embodiments of the present invention, the projection height (see "a1" and "a2" of FIGS. 1 and 5, respectively) is different for the crimping member 58, 58' of different inserts 54 and adapters 56. In this way, for example, provision is made for a single self-piercing valve system 10 having interchangeable inserts and adapters to not only cradle piping 11 of different diameters, but to, also, effect a different depth (a1, a2) of indentation 59 in the wall of the different sized piping.

Whereas, the crimping member 58, 59 of the herein described embodiments is shown as a single, elongated projection, crimping members of other shapes and arrangements of projections are acceptable, such as, for example only, a plurality of ridges arranged in series or a plurality of parallel ridges or a plurality of truncated cones in a pattern.

The gasket 24 is a rubber gasket having an aperture 27, shown in FIG. 4 through which the needle 28 extends through, and serves to create a fluid seal about a pipe 11 which the solid needle 28 is driven into and punctures, whereby retraction of the needle 28 causes fluid to flow through the aperture 27 and around the needle 28. The upper clamp member 12 further includes passage 40 from the aperture of the gasket 24 through the interior of the upper clamp member 12 (not shown) to an outlet 42 on the upper clamp member 12, as shown in FIGS. 1 and 4. The outlet 42 may include an outer lip 44 such that pipes with standard clamping ends known in the art are selectively attached thereto.

As illustrated in FIG. 4, the bottom end 16 of the upper clamp member 12 further includes a pair of lateral extensions 60 having a pair of apertures 27 through which screws 26 (shown in FIGS. 1 and 2) are fitted. When so embodied, the upper clamp member 12 further includes supports 46 extending from the lateral extensions 60 to the middle of top end 14 to strengthen the lateral extension 60 and thus the clamp 62.

A method of using the self-piercing valve assembly 10 to selectively extract fluid from a fluid-filled pipe 11 is provided. Upper clamp member 12 of the self-piercing valve assembly 10 is placed such that the recess 30 on the lower end 16 of the upper clamp member 12 partially encircles a fluid-filled pipe 11, and the lower clamp member 18 is likewise placed such that recess 32 on the top side 20 of the lower clamp member 18 partially encircles the fluid-filled pipe 11 opposite the upper clamp member 12, and the lower clamp member 18 is fastened to the upper clamp member 12 from the insertion and tightening of screws 26, shown in FIG. 2, to thereby form a clamp 62 around the fluid-filled pipe 11 such that crimping member 58 abuts and deforms the pipe (indentation 59) to create a key-keyway type interface and interaction to retard relative rotation of the valve 10 and pipe 11. Then the needle 28 is selectively extended from the upper clamp member 12, through the gasket 24 to puncture the fluid-filled pipe 11 such that the fluid flows from the fluid-filled pipe 11 through the passage 40 to the outlet 42 on the upper member 12. If the lower clamp member 18 is embodied as having the apertures 38, shown in FIGS. 2 and 4, then the step of fastening the lower clamp member 18 to a surface prior to partially enclosing a fluid-filled pipe 11 within the recess 32 of lower clamp member 18 is used.

When the self-piercing valve assembly 10 is embodied using adapter 56 having a rigid projection 58', then the mounting tab 55 of an appropriately sized adapter is placed within notch 52 in the recess 32 of lower member 18 prior to the lower member 18 being placed to partially encircle a fluid-filled pipe 11. If a pre-sized boot segment 57 of adapter 56 is used to fit about a pipe smaller in diameter than recesses 30 and 32, then the appropriate pre-sized adapter must be determined according to the size of the specific fluid-filled pipe 11 prior to such step.

While there has been shown the preferred and alternate embodiments of the invention, it is to be understood that the invention may be embodied otherwise than is herein specifically shown and described, and that within said embodiments, certain changes may be made in the form and arrangements of the parts of the invention without departing from the underlying ideas or principles of this invention as set forth in the Claims appended herewith. In addition, the corresponding structures, materials, acts, and equivalents of all means or step plus function elements in the claims are intended to include any structure, material or act for performing the functions in combination with other claimed elements, as specifically claimed herein.

What is claimed is:

1. A self-piercing valve assembly, comprising:
   a body comprised of an upper member and a lower member, said upper member having a top end and a bottom end, said bottom end of said upper member including a recess, said upper member further including a passage extending through said upper member from said bottom end to an outlet on said top end of said upper member, and said lower member having a top side and a bottom side, said top Side of said lower member including a recess;
   a solid needle within said upper member and selectively extending within said passage and into said recess on said bottom end of said upper member;
   a seal associated with said upper member and said needle;
   needle extending means on said upper member to selectively extend said needle within said passage and into said recess on said bottom end of said upper member;
   fastening means to selectively fasten said lower member to said upper member such that said recess of said upper side of said bottom member and said recess of said bottom end of said upper member for a clamp; and
   a fixed, rigid extending projection wit said clamp, said projection being integral with one of said upper member and said lower member, said projection retarding rotation of said assembly about a pipe held within said clamp,
   whereby said upper member and lower member are fitted about a fluid-filled pipe such that said projection automatically deforms the pipe as said upper member and said lower member are fitted about the pipe to thereby retard relative rotation of said assembly about the pipe, and said needle is selectively extended to pierce said pipe and selective retraction of said needle allows the fluid to flow through said passage to said outlet of said upper member.

2. The self-piercing valve assembly of claim 1, wherein said sealing means within said recess of said bottom end of said upper member is a rubber gasket attached thereto and which includes an aperture therethrough.

3. The self-piercing valve assembly of claim 2, wherein said needle extending means is comprised of:
   a threaded stem rotatably extending through said upper member and connected to a rotatable knob on said upper end of said upper member; and
   said needle includes an internally threaded portion mated with said threaded member,
   whereby rotation of the knob selectively extends and retracts said needle through said aperture of said gasket and into said recess on said bottom end of said upper member.

4. The self-piercing valve assembly of claim 1, wherein said bottom end of said upper member further includes a pair of lateral extensions and said lower member is shaped to complement said bottom end of said upper member when said upper member and said lower member are fastened together.

5. The self-piercing valve assembly of claim 4, wherein said fastening means for selectively fastening said lower member to said upper member is a plurality of screws.

6. The self-piercing valve assembly of claim 5, wherein said lower member further includes a plurality of apertures whereby said lower member may be secured to a surface by screws inserted therethrough and into the surface.

7. The self-piercing valve assembly of claim 1, wherein said rigid projection is on said recess of said top side of said lower member.

8. The self-piercing valve assembly of claim 1, further including a pre-sized adapter including a rigid crimping member integral therewith, said adapter fitting within said recess of said top side of said lower member whereby pipes having a specific diameter are crimped by sail crimping member and the pipe is thereby rotationally retarded within said clamp.

9. The self-piercing valve assembly of claim 8, wherein said recess on said top side of said lower member includes a notch therein and said adapter includes a boot which slides within said notch to thereby hold said adapter within said recess on said top side of said lower member.

10. A method of selectively extracting fluid from a pipe, comprising the steps of:

placing an upper member of a body, the upper member having a top end and a bottom end, and the bottom end of the upper member including a recess and a sealing means within the recess, the upper member further including a passage extending from the sealing means to an outlet on the upper member, such that the recess on the bottom end partially encloses a fluid-filled pipe;

placing a lower member of the body, the lower member having a top side including a recess and a bottom side such that the recess on the top side partially encloses the fluid-filled pipe opposite the recess on the bottom end of the upper member;

fastening the lower member to the upper member to thereby form a clamp around the pipe;

retarding the rotation of the pipe within the clamp through a fixed, rigid extending projection integral with one of the upper member and the lower member, the projection provided within the clamp and automatically crimping the pipe upon fastening of the upper member and lower member around the pipe to thereby retard relative rotation of the pipe held within the clamp; and selectively extending a solid needle from the upper member through the sealing means to puncture the pipe such that the fluid flows through the passage to the outlet.

11. The method of claim 10, wherein the step of selectively extending the needle is selectively extending the needle through an aperture of a gasket attached to the recess of the bottom end of the upper member.

12. The method of claim 11, wherein the step of selectively extending the needle is rotating a knob on the upper end of the upper member thereby rotating a threaded screw within the upper member which mates with an internally threaded portion of the needle to thereby actuate extension of the needle.

13. The method of claim 10, wherein the step of fastening is fastening the lower member to the upper member with a plurality of screws.

14. The method of claim 10, further including the step of fastening the lower member to a surface prior to fastening the lower member to the upper member.

15. The method of claim 14, wherein the step of fastening the lower member to a surface is fastening the lower member to a surface by driving screws through a plurality of apertures in the lower member and into the surface.

16. The method of claim 10, wherein the step of retarding the rotation of the pipe by contact with a projection on the clamp is retarding rotation by contact with a rigid projection on the recess on the top side of the lower member.

17. The method of claim 10, further including the step of placing a pre-sized adapter including an integral rigid crimping member within the clamp to accommodate a pipe of a specific diameter prior to fastening the lower member to the upper member and thereby crimp the pipe during fastening of the upper and lower members.

18. The method of claim 17, wherein the step of placing a pre-sized adapter within the clamp is placing a boot on the adapter within a notch on the recess on the top side of the lower member to thereby hold the adapter within the recess on the top side of the bottom member.

19. A self-piercing valve assembly, comprising:

a clamping assembly for fitting about a fluid-filled pipe;

a pipe-tapping assembly for selectively taping a fluid-filled pipe;

said clamping assembly including a pipe engaging surface and at least one fixed, rigid crimping member integral with and projecting from said pipe engaging surface; and whereby said crimping member automatically crimps the fluid-filled pipe as the clamping assembly is fitted around the pipe and thereby retards relative rotation of said clamping assembly about the pipe, and said pipe-tapping assembly is used to selectively tap the fluid-filled pipe held within the clamping assembly.

20. The self-piercing valve assembly of claim 19, wherein said crimping member is an elongated fixed rigid projection.

21. The self-piercing valve assembly of claim 19, further comprising a pre-sized adapter selectively fitting within said clamping member, whereby said clamping assembly accommodates pipes of different diameters.

22. The self-piercing valve assembly of claim 19, wherein said crimping member is opposite about the fluid-filled pipe from said pipe-tapping assembly.

23. The self-piercing valve assembly of claim 21, further including a rigid integral crimping member on said adapter.

24. In combination:

a pipe;

a self-piercing valve including a clamping assembly, and at least one fixed, rigid extending crimping member integral with and projecting into said clamping assembly, and a pipe-tapping assembly, said self-piercing valve attached to and selectively removable from said pipe; and said crimping member automatically crimping said pipe upon said clamping assembly being fastened around said pipe and thereby retarding relative rotation of said pipe within said clamping assembly.

25. The combination of claim 24, wherein said crimping member is an elongated rigid projection.

26. The combination of claim 24, further including a plurality of pre-sized adapters selectively fitted within said clamping assembly and around said pipe, each said adapter including a rigid integral crimping member for automatically crimping said pipe upon said clamping assembly being fastened around said pipe.

27. The combination of claim 21, wherein said pipe is fluid-filled.

28. The combination of claim 23, further including a fluid transfer assembly within said pipe-tapping assembly to transfer fluid from said pipe through said pipe-tapping assembly to an outlet thereupon.

29. A self-piercing valve assembly, comprising:

a clamping assembly for fitting about a fluid-filled pipe;

a pipe-tapping assembly for selectively tapping a fluid-filled pipe;

said clamping assembly including an insert having at least one rigid crimping member integral therewith and projecting into said clamping assembly; and wherein the crimping member automatically crimps the fluid-filled pipe as said clamping assembly is fitted around the pipe and thereby retards relative rotation of said clamping assembly about the pipe, and said pipe-tapping assembly is used to selectively tap the fluid-filled pipe, held within said clamping assembly.

30. The self-piercing valve assembly of claim 25, wherein said clamping assembly includes a notch, and said insert removably fits within said notch such that said crimping member projects into said clamping assembly.

31. The self-piercing valve assembly of claim 30, wherein said insert is elongate and said crimping member extends substantially the length of said insert.

32. A self-piercing valve assembly, comprising:

a clamping assembly for fitting about a fluid-filled pipe;

a pipe-tapping assembly for selectively tapping a fluid-filled pipe;

a pre-sized adapter selectively fitting within said clamping assembly, wherein said adapter accommodates a pipe having a specific diameter, said adapter Firer including at least one rigid crimping member integral therewith and projecting into said clamping assembly; and wherein the crimping member automatically crimps the fluid-filled pipe as said clamping assembly is fitted around the pipe and thereby retards relative rotation of said clamping assembly about the pipe, and said pipe-tapping assembly is used to selectively tap the fluid-filled pipe held within said clamping assembly.

33. The self-piercing valve assembly of claim 32, wherein said adapter is elongated and said crimping member is elongate and is positioned substantially along the length of said adapter.

34. The self-piercing valve assembly of claim 33, wherein said crimping member is positioned in said clamping assembly to be opposite about the fluid-filled pipe from said pipe-tapping assembly.

\* \* \* \* \*